US008601460B2

(12) United States Patent
Karstens

(10) Patent No.: US 8,601,460 B2
(45) Date of Patent: Dec. 3, 2013

(54) SYSTEMS AND METHODS FOR FIRMWARE CLONING

(75) Inventor: Christopher K. Karstens, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 1090 days.

(21) Appl. No.: 11/828,059

(22) Filed: Jul. 25, 2007

(65) Prior Publication Data

US 2009/0031299 A1    Jan. 29, 2009

(51) Int. Cl.
*G06F 9/44*       (2006.01)
*G06F 15/177*    (2006.01)

(52) U.S. Cl.
USPC .......................... 717/168; 717/173; 709/220

(58) Field of Classification Search
None
See application file for complete search history.

(56) References Cited

U.S. PATENT DOCUMENTS

| | | | |
|---|---|---|---|
| 6,055,632 A | 4/2000 | Deegan et al. | |
| 6,247,168 B1 | 6/2001 | Green | |
| 7,146,412 B2 * | 12/2006 | Turnbull | 709/220 |
| 7,222,339 B2 * | 5/2007 | Rothman et al. | 717/168 |
| 7,240,106 B2 * | 7/2007 | Cochran et al. | 709/222 |
| 7,246,224 B2 * | 7/2007 | Rothman et al. | 713/1 |
| 7,577,722 B1 * | 8/2009 | Khandekar et al. | 709/220 |
| 7,814,480 B2 * | 10/2010 | Sakuda et al. | 717/173 |
| 7,827,252 B2 * | 11/2010 | Hopmann et al. | 709/217 |
| 7,904,533 B1 * | 3/2011 | Gonzalez et al. | 709/220 |
| 8,387,037 B2 * | 2/2013 | Henseler et al. | 717/168 |
| 2002/0073304 A1 | 6/2002 | Marsh et al. | |
| 2002/0199044 A1 | 12/2002 | Futterman | |
| 2003/0065754 A1 | 4/2003 | Jones et al. | |
| 2003/0097426 A1 * | 5/2003 | Parry | 709/220 |
| 2004/0030877 A1 | 2/2004 | Frid | |
| 2004/0205779 A1 | 10/2004 | Almeida et al. | |
| 2004/0210887 A1 * | 10/2004 | Bergen et al. | 717/168 |
| 2004/0237078 A1 * | 11/2004 | Weiss et al. | 717/168 |
| 2004/0243798 A1 | 12/2004 | Goud et al. | |
| 2005/0193393 A1 | 9/2005 | Fausak | |
| 2005/0235280 A1 * | 10/2005 | Le et al. | 717/173 |
| 2006/0015781 A1 | 1/2006 | Rothman et al. | |
| 2006/0015861 A1 | 1/2006 | Takata et al. | |
| 2007/0130286 A1 * | 6/2007 | Hopmann et al. | 709/217 |
| 2007/0268516 A1 * | 11/2007 | Bugwadia et al. | 358/1.15 |
| 2007/0277169 A1 * | 11/2007 | Rao et al. | 717/173 |
| 2008/0320110 A1 * | 12/2008 | Pathak | 709/220 |

OTHER PUBLICATIONS

Kallahalla et al.SoftUDC: A Software-Based Data Center for Utility Computing. Computer, vol. 37, Nov. 2004, pp. 38-46, Retrieved on [Jul. 19, 2013] Retrieved from the Internet: URL<http://ieeexplore.ieee.org/stamp/stamp.jsp?tp=&arnumber=1362586>.*

(Continued)

*Primary Examiner* — Thuy Dao
*Assistant Examiner* — Cheneca Smith
(74) *Attorney, Agent, or Firm* — Cantor Colburn LLP; Steven Bennett

(57) ABSTRACT

Systems and methods for firmware network device firmware cloning are described herein. Exemplary embodiments include firmware cloning systems and methods, including a means for reading firmware code stored in a network device for and copying the firmware code to another network device. In a blade server environment, a firmware-cloning utility is stored in a non-volatile memory of each network device. The firmware-cloning utility becomes a component of the actual firmware. The firmware-cloning utility allows firmware to be installed directly from one network device's non-volatile memory to another network device.

8 Claims, 5 Drawing Sheets

Flow Diagram (Network to Server)

(56) References Cited

OTHER PUBLICATIONS

Agrawal et al.Policy-Based Management of Networked Computing Systems. Communications Magazine, IEEE, vol. 43, Oct. 2005, pp. 69-75, Retrieved on [Jul. 19, 2013] Retrieved from the Internet: URL<http://ieeexplore.ieee.org/stamp/stamp.jsp?tp=&arnumber=1522127>.*

QuantumData Model 802 Series, Quick Start Guide, Oct. 23, 2001, Part #68-00193 Rev. D.

SNMP Administrator, [ONLINE]; [retrieved on Jul. 17, 2007]; retrieved from the Internet http://www.computerlab.com.

* cited by examiner

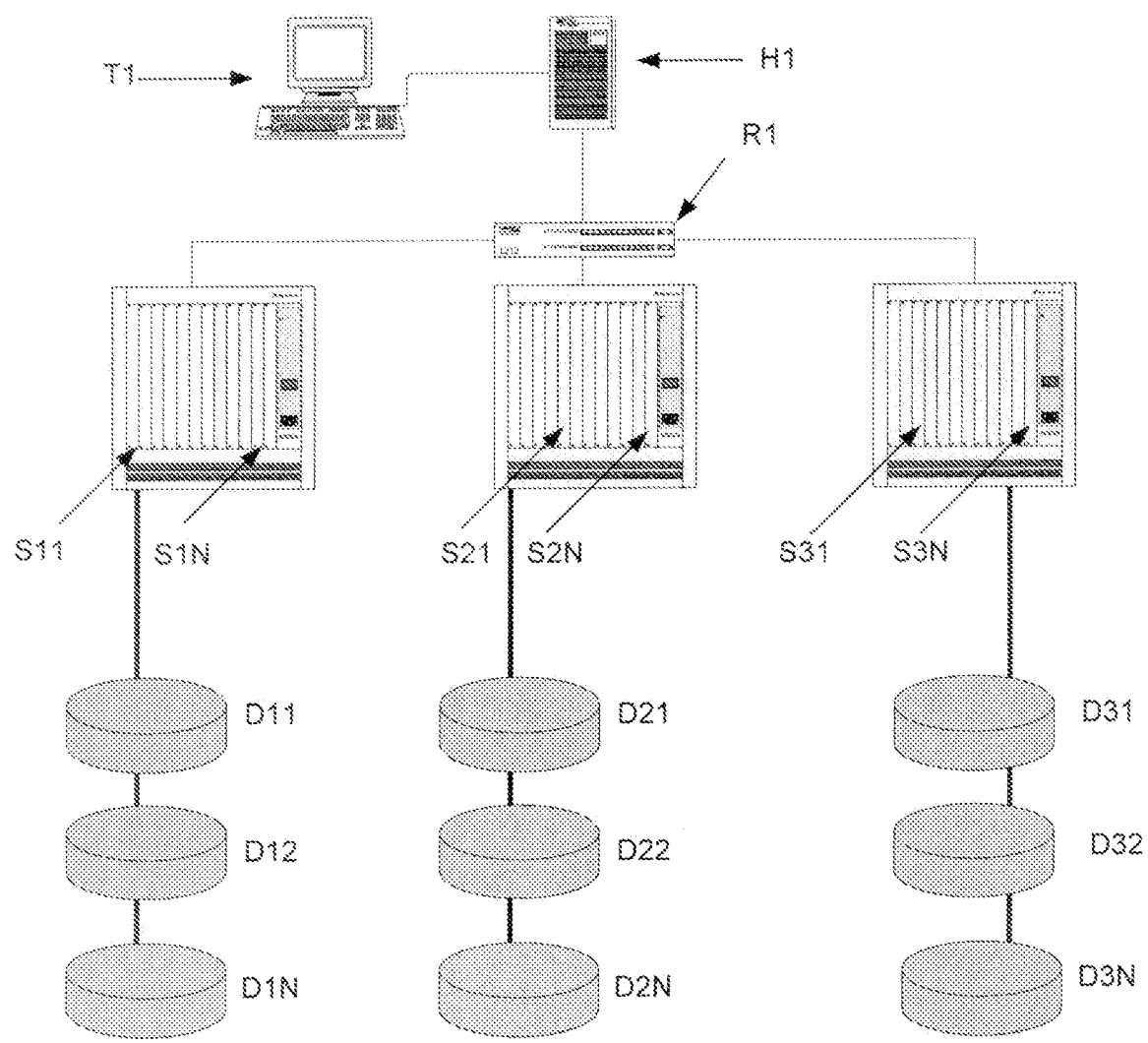
FIG. 1: Server Network

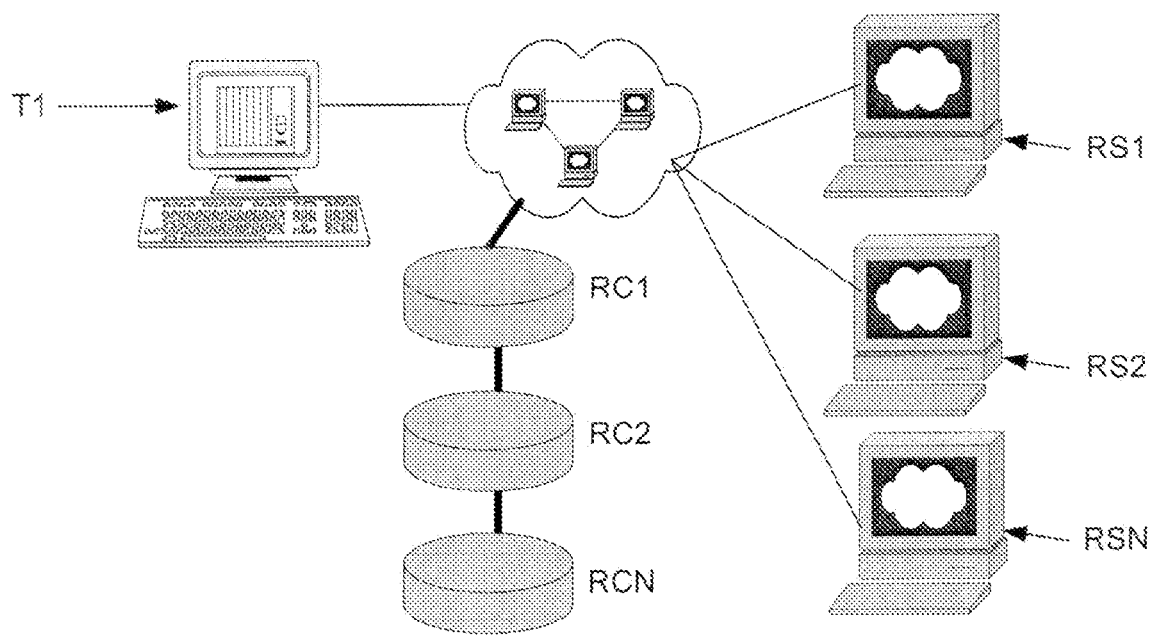
FIG. 2: Distributing Cloned Firmware Over A Network

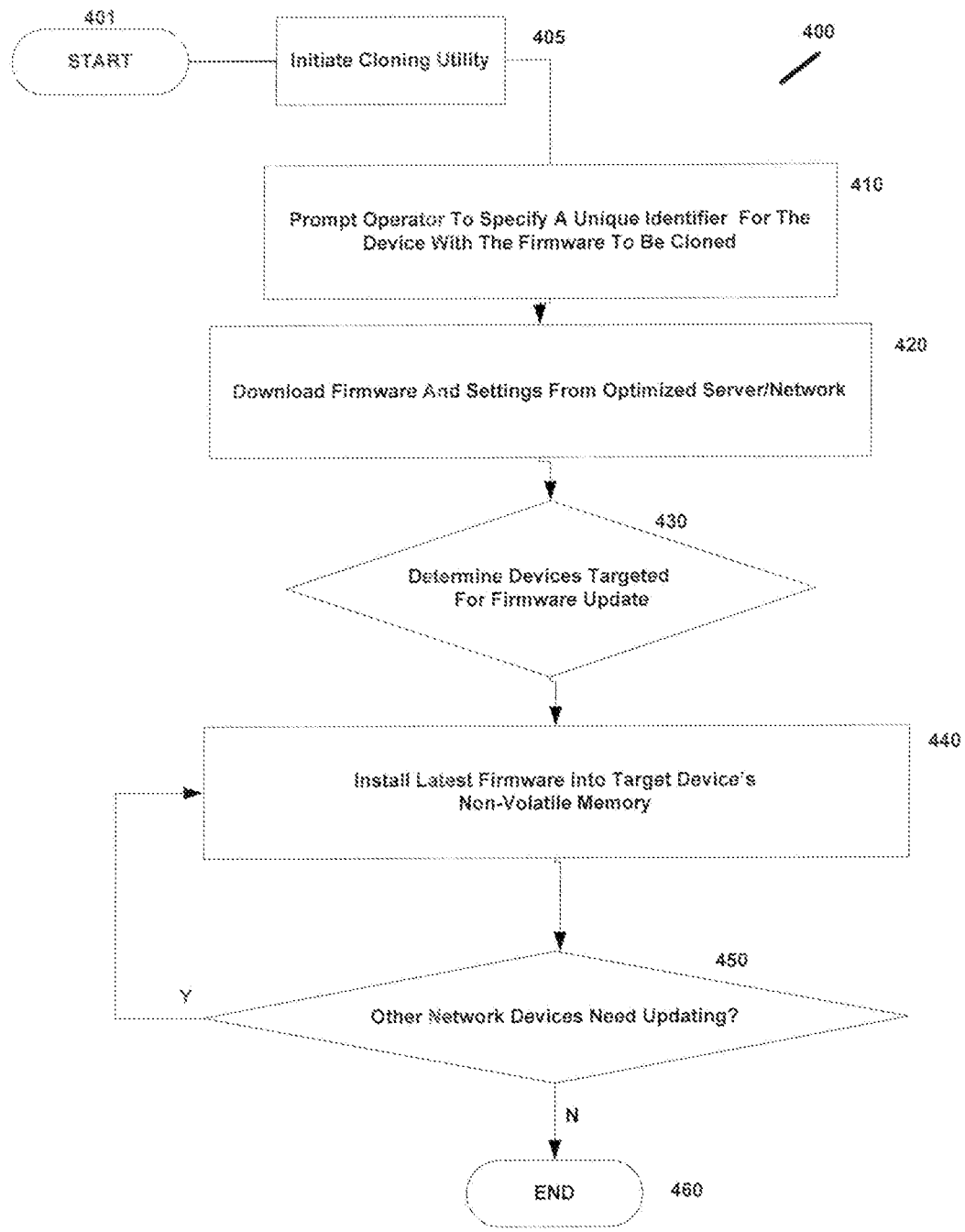
Figure 3A: Flow Diagram (Network to Server)

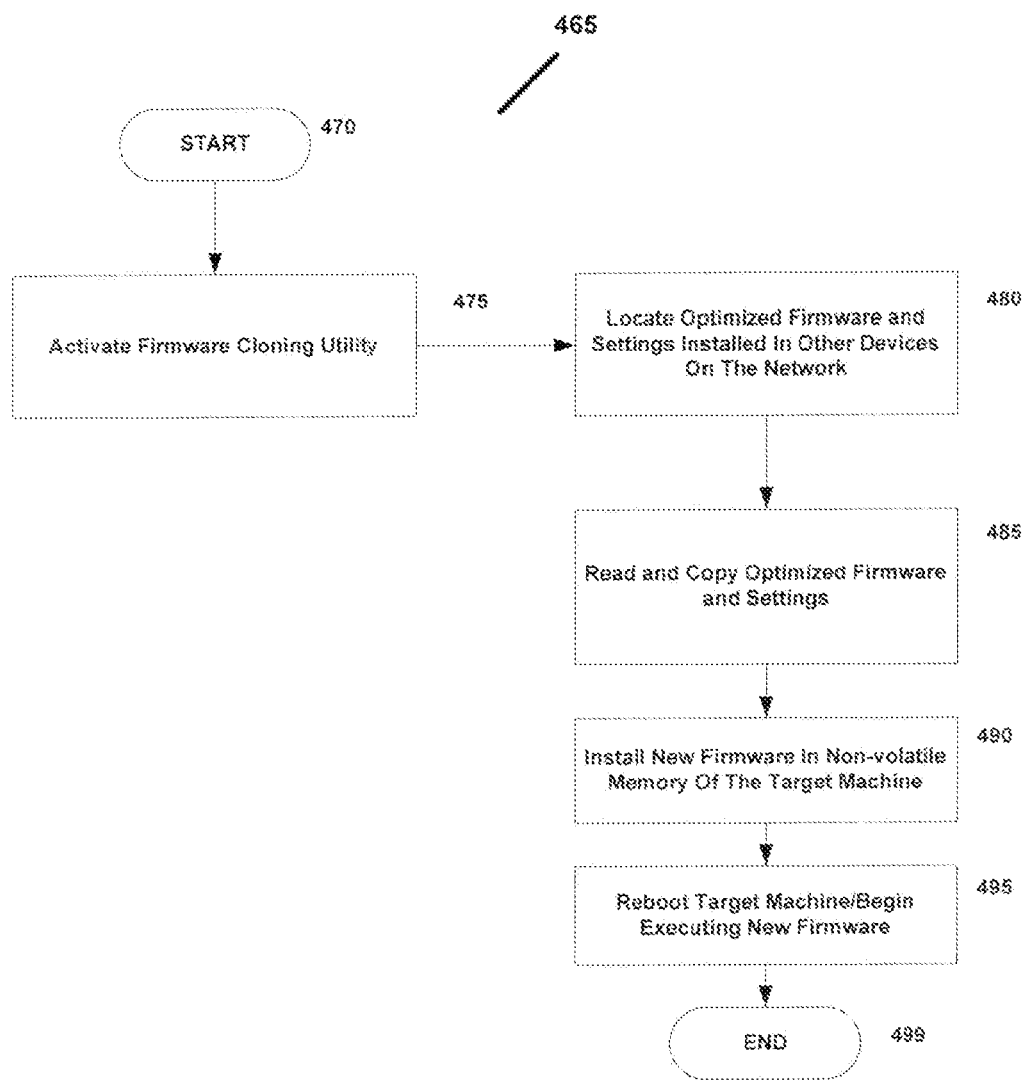
FIGURE 3B: Flow Diagram (Server to Server)

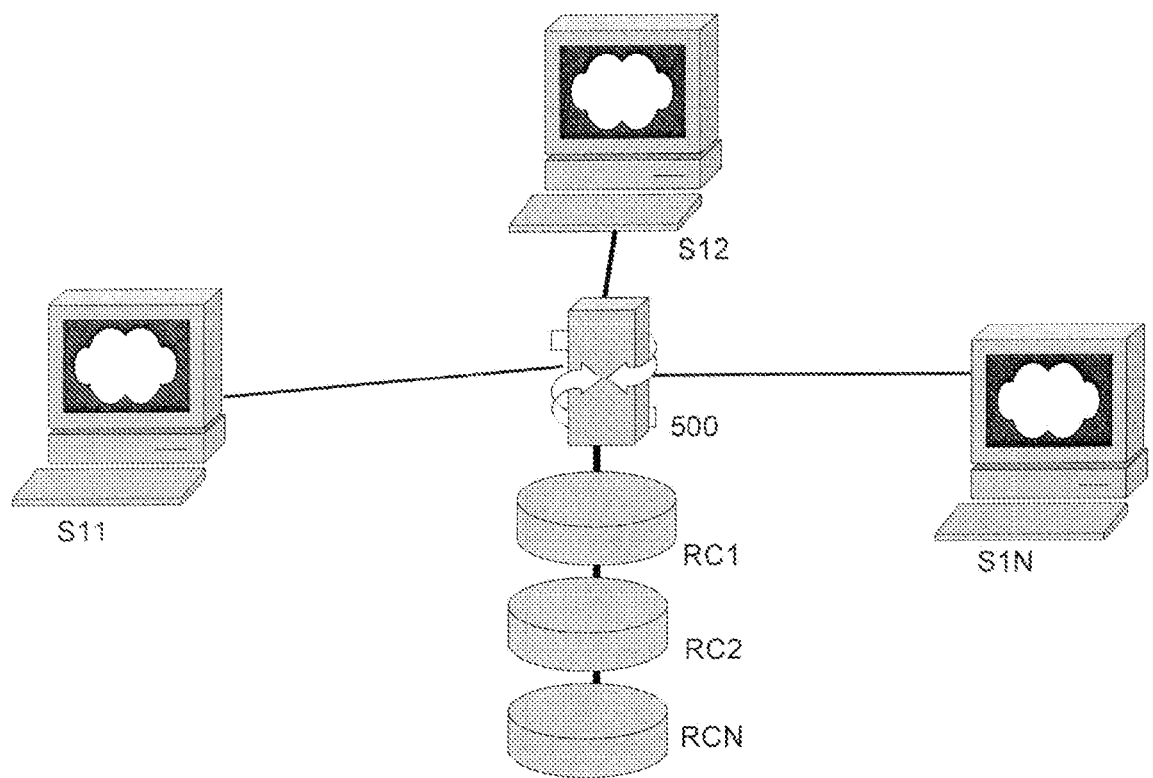
Figure 4: Management Module

SYSTEMS AND METHODS FOR FIRMWARE CLONING

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to cloning firmware stored in a server, and particularly to systems and methods for firmware cloning.

2. Description of Background

In large corporate computing environments, it is not uncommon to have hundreds, if not thousands, of computer servers. Maintenance of such a large number of computer servers can be costly and time consuming. Often the computer server's firmware has to be updated to repair security or networking issues. Information technology professionals often have to take on the tedious, costly and time consuming task of individually updating each server with the latest firmware and software updates. Still, in a computing environment with hundreds or thousands of servers, it's not uncommon for some servers to receive a complete suite of firmware updates, while some servers only receive a partial firmware update. This lack of consistency among the various servers often results in inefficiencies and other problems on the network. What is needed is a method of automatically cloning the firmware among the plurality of servers such that every server contains the same updates.

SUMMARY OF THE INVENTION

Exemplary embodiments include a firmware cloning system and method. A communications network connects two or more networked devices. The cloning utility executes a firmware package in a host networked device and at least one target networked device. The cloning utility executing in the host-networked device locates a firmware package that has been manually configured and optimized for the network and stored in a memory of a manually configured networked device. The host server reads the firmware package stored in the memory of the manually configured networked device. The read firmware package is cloned to a non-volatile memory of the at least one target networked device. The cloned firmware package executes in the at least one target networked device, such that the at least one target network device now contains the firmware package that has been manually configured and optimized for the network.

System and computer program products corresponding to the above-summarized methods are also described herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

Technical Effects

As a result of the summarized invention, technically a firmware packaging system and method has been created specifically for the purposes of cloning one or more network servers wherein a utility is provided for automatically reading firmware code from a host server and installing the firmware code verbatim over a network in one or more complimentary servers such that every server has an identical firmware package.

BRIEF DESCRIPTION OF THE DRAWINGS

The subject matter, which is regarded as exemplary embodiments of the invention, is particularly pointed out and distinctly claimed in the claims at the conclusion of the specification. The foregoing and other objects, features, and advantages of the exemplary embodiments are apparent from the following detailed description taken in conjunction with the accompanying drawings in which:

FIG. 1 is a block diagram of an exemplary computer network server bank;

FIG. 2 illustrates an exemplary computer network method implementing firmware cloning;

FIGS. 3A and 3B are flow diagrams of an exemplary method for firmware cloning; and FIG. 4 illustrates an exemplary management module configuration for implementing the firmware cloning system and method.

The detailed description explains the preferred embodiments, together with advantages and features, by way of example with reference to the drawings.

DETAILED DESCRIPTION OF THE INVENTION

Exemplary embodiments include systems and methods for a firmware packaging system that has been created for cloning one or more network servers, wherein a utility is provided for automatically reading firmware code from a host server and installing the firmware code verbatim over a network in one or more complimentary servers such that every server has an identical firmware package.

FIG. 1 is a diagram of an exemplary computer network server system. In an exemplary embodiment, the terminal device T1 may be a personal computer that is operated by an information technology (IT) professional, such as a system administrator. The terminal T1 connects to a host server H1 that administers the network for a plurality of network devices including, for example, servers S11-S1N; S21-S2N; S31-S3N, network adaptors (routers) R1 and network storage (e.g. hard drives or a redundant array of independent disks (RAID)) D11-D1N; D21-D2N; D31-D3N. In an exemplary embodiment the system administrator controls and administers the entire network from the terminal T1.

Each device in the network has its own firmware. Firmware is software that is embedded into the hardware of an electronic device. Firmware includes machine language code having instructions and/or configuration settings for a processor of a hardware device. Firmware may be stored in a non-volatile read-only-memory (e.g. ROM, erasable programmable ROM (EPROM), or electrically erasable programmable ROM (EEPROM)).

To maximize network security and efficiency, it is ideal for the plurality of network devices to have the same firmware and firmware settings. In an exemplary embodiment, the already installed firmware is manually configured to ideal specifications in one network device (e.g., host server H1). According to an exemplary embodiment, a system and method are provided for extracting the firmware code and the manually configured firmware settings, from the one network device (e.g., H1) and automatically cloning and uploading the manually configured firmware and settings to every targeted like component (e.g. servers S11-S1N; S21-S2N; S31-S3N, network adaptors (routers) R1 and network storage (RAID) D11-D1N; D21-D2N; D31-D3N).

Although firmware is typically stored in read only memory (ROM), there exists today non-volatile memory (e.g., Flash-memory) that is capable of random access storage. In an exemplary embodiment, the various network devices may contain a non-volatile memory that can be randomly accessed rather than ROM. Therefore, this type of non-volatile memory in a machine on the network can be read from and written too.

FIG. 1 illustrates a blade server environment wherein a terminal management module T1 manages an entire blade server chassis. A network utility application (NUA) having a graphical user interface (GUI) for displaying the entire blade server environment reveals which version of the firmware is operable on each server component (S11-S3N). The IT administrator can select all or a subset of servers for a firmware update. For example, if the NUA indicated that server S11 contained optimal firmware, while server S3N contained outdated firmware, the IT administrator would be given the option of cloning the firmware from server S11 to S3N. Furthermore, each server may have many different firmware packages executing on the devices contained within them. For example the basic input/output system (BIOS), the baseboard management controller (BMC), the network interface card (NIC) controller, the hard drive (HDD) controller, the Fibre controllers, and the diagnostic (DIAG) controllers in a computing environment each contain their own version of firmware. Each server may have a one of more of these devices executing their own version of firmware within. The firmware in each device may be manually configured with optimized settings and cloned to a targeted, like device.

To accomplish these embodiments, each of the network devices contains a clone utility application in its existing firmware. The clone utility allows the NUA to determine which of the network devices require updating. The clone utility also allows firmware on a host machine to be cloned to another like device in the network. As mentioned above, in a blade server environment, the NUA allows terminal T1 to manage the entire blade server chassis. The clone utility is installed in every server (e.g. S11-S3N) or network device (D11-D3N) in the network, which allows any of these network devices to clone the firmware running on an optimized machine. For example, firmware that has been manually configured with optimized settings in a HDD controller executing within one server in the blade server chassis may be cloned to a HDD controller executing within another server in the blade server chassis. In one embodiment, the clone utility allows the terminal T1 to manage the cloning of firmware from one device to another. However, another embodiment the clone utility facilitates the direct cloning (device-to-device) of firmware from one network device to another. Therefore, frequent and periodic updates to the firmware of the networked servers mounted in the chassis are possible.

The NUA also operates with remote servers (e.g. RS1-RSN) and network devices (e.g. RC1-RCN), as illustrated in FIG. 2. In a non-blade environment, the media access control (MAC) address of each network device is known. The MAC address allows the NUA interact with stand-alone servers located in different areas. The NUA locates the target network device via its MAC address on the network. The NUA triggers the clone utility in the target network device to install new firmware. This allows the NUA to work with multiple banks of different network components in different locations. This allows the firmware to be constantly updated. These system wide updates save time and resources, while allowing each network device to successfully clone the optimized machine.

FIG. 3A illustrates a flow chart describing the cloning process for servers connected across a network or in a blade server chassis. The methodology 400 begins by initiating the cloning utility component stored in the firmware of the host server and/or one or more network devices that are targeted for a firmware update at step 405. The cloning utility prompts an operator to specify a unique identifier (e.g. MAC address) for the device with the firmware to be cloned at step 410. Once the optimized server is located, the cloning utility reads and downloads optimized firmware and preferences settings from the optimized server or network device at step 420. At step 430, the cloning utility determines which devices are targeted for a firmware update. The cloning utility installs the optimized firmware and preference settings into the targeted network device's non-volatile memory as seen in step 440. Next the cloning utility determines if all targeted network devices have been updated as shown at step 450. If there are other targeted network devices to be updated, the cloning utility repeats the process at step 440 and clones the firmware in these other devices. Finally, once the firmware installation is complete, the cloning utility terminates at step 460.

Similar to the process above, FIG. 3B illustrates a process 465 wherein the system administrator, software, or computer user decides it is time to update the firmware on a target machine. The process 465 in FIG. 3B describes a point-to-point cloning process, wherein one networked device copies the firmware of another networked device. The cloning utility is stored in firmware of each network device and executes a process for updating the firmware on the target machine once it is activated as shown in step 475. The cloning utility can be activated by a button on the front of the target machine, a process in software, and/or a scheduled event in the firmware of the target machine. In one embodiment, the cloning utility executes on the target machine and searches for and locates optimized firmware code and settings installed in another like networked device, as shown at step 480. Alternatively, the operator specifies a unique identifier (e.g. MAC address) of the machine to be cloned. The other like networked device is an optimized networked device that contains the latest updates for operating efficiently on the network. The cloning utility executing on the target machine reads and copies firmware code and settings from the optimized network device as shown at step 485. The cloning utility then installs the new firmware code and settings in the non-volatile memory of the target machine at step 490. The target machine, having new firmware code and settings installed, reboots to begin executing the new firmware code, as shown in step 495. Once the firmware updated is completed, the cloning utility ends execution until the next activation, as shown at step 499. In still another embodiment there may be multiple target machines copying firmware code and settings from the optimized network device, creating a point-to-multipoint system. Both embodiments create a simple solution for updating firmware, wherein the IT administrator simply has to activate the cloning utility and direct each of the target machines to the optimized network device.

In one embodiment, shown in FIG. 4, the clone utility may execute in a management module 500 that operates in as a "man-in-middle" implementation, thereby eliminating the need for a terminal device T1 and host server H1 to manage updates in the network. An IT administrator may determine that a new BIOS update is needed and initiate the management module 500 to check the network for firmware updates. Alternatively, the management module 500 may also compare firmware among the various components in the network, and once it determines that a network component contains out-of-date firmware code, it may prompt the IT administrator to schedule the network component for a firmware update. The management module 500 may also schedule the update based on rules set by the IT administrator or it may schedule the update based on minimal usage statistics for the targeted network components.

In one embodiment, also shown in FIG. 4, the IT administrator prompts the management module 500 to locate the most up-to-date firmware code and settings on the network. The IT administrator may also use a unique identifier (e.g. MAC address) to point to an optimized networked device that contains the latest updates for operating efficiently on the network. The management module 500 may serve as an intermediate server by reading, downloading and storing the firmware code and settings from the optimized network device. Each of the target devices S11-S1N and RC1-RCN may then download the up-to-date firmware code and settings from the management module 500. The target devices S11-S1N and RC1-RCN, having new firmware code and settings installed, reboots to begin executing the new firmware code. Once the firmware updated is completed, the cloning utility ends execution until the next activation.

The management module 500 may be a systems management server, a RAID system, or other storage system. The management module 500 allows network components to be updated without downloading firmware from the Internet. Instead, the firmware is simply copied and cloned from one network device to next. Thus, only devices having manually configured firmware and firmware settings are cloned among the devices in the network. This ensures the devices in the network operate more efficiently as each device has similar or identical firmware settings, rather than factory presets, for example.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A processor implemented firmware cloning method, comprising:
   providing a communications network connecting two or more networked devices;
   presenting a graphical representation of the communications network environment to a user on a graphical user interface, the graphical representation of the communications network environment including an indication of which version of a firmware package is operable on each networked device component in the communications network;
   receiving an input from the user using the graphical user interface that is indicative of a selection of a first networked device presented in the graphical representation of the communications network, the first networked device controlled by a terminal device and administered by a system administrator, and having a particular version of the firmware package operable on the first networked device, the input by the user operative execute a cloning utility in a firmware package of the first networked device and a second networked device;
   locating, without using a web browser, a firmware package that has been manually configured and optimized for the network and stored in a memory of the first networked device using the cloning utility executing on the first networked device, wherein the firmware package is presently operative to at least partially control the first networked device;
   cloning the located firmware package to a non-volatile memory of the second networked device using the cloning utilities executing on the first networked device and the second networked device;
   executing the cloned firmware package in the second networked device, such that the second networked device now contains and operates with a clone of the firmware package that is presently operative to at least partially control the first networked device; and
   indicating via a graphical user interface an optimized network device executing the manually configured firmware package that has been optimized for the network and providing a unique identifier for the optimized network device so that its firmware package can be cloned.

2. The method of claim 1 wherein the unique identifier is a media access control address.

3. The method of claim 2, wherein, the cloning utility of the first networked device is operative to use the unique identifier of each network device to locate the network device having the firmware package that has been manually configured and optimized for the network.

4. A firmware cloning system having a processor, comprising:
   a communications network connecting two or more network devices;
   a first networked device communicatively connected to the communications network executing a cloning utility in firmware;
   a second networked device communicatively connected to the communications network executing a cloning utility in firmware;
   a terminal communicatively connected to the communications network having a display operative to present a graphical representation of the communications network environment to a user, the graphical representation of the communications network environment including an indication of which version of a firmware package is operable on each networked device component in the communications network, wherein the terminal is further operative to receive an input from the user indicative of a selection of a first networked device having a particular version of the firmware package operable on the first networked device, and output an activation signal responsive to receiving the input from the user;

the terminal including a graphical user interface for indicating an optimized network device executing the manually configured firmware package that has been optimized for the network and providing a unique identifier for the optimized network device so that its firmware package can be cloned;

the cloning utility of the first networked device operable exclusive from a web browser, and operative to locate a firmware package that has been manually configured and optimized for the network and stored in a memory of the first network device, responsive to receiving the activation signal herein the firmware package is presently operative to at least partially control the first networked device; and the cloning utility copying the located firmware package from the memory of the first networked device to a memory of the second networked device such that the second networked device now contains a clone of the firmware package that is presently operative to at least partially control the first networked device.

5. The system of claim 4 wherein the memory of the second networked devices is a non-volatile random access memory.

6. The system of claim 5 further comprising wherein the unique identifier is a media access control address.

7. The system of claim 6 wherein the second networked device executes the cloning utility, the cloning utility uses the unique identifier of each network device to locate the network device having the manually configured firmware package that has been optimized for the network and directly cloning the manually configured firmware package that has been optimized for the network to the target network device.

8. A firmware cloning system having a processor, comprising:

a communications network connecting two or more network devices;

a first networked device communicatively connected to the communications network executing a cloning utility in firmware;

a second networked device communicatively connected to the communications network executing a cloning utility in firmware;

a plurality of target networked devices, each of the target networked devices including a target cloning utility to install a firmware stored externally from a respective target networked device;

a host networked device including a host cloning utility, the host cloning utility operable exclusive from a web browser, and operative to communicate with the target cloning utility of each target networked devices without input from a user, and operative to locate a firmware package that has been manually configured and optimized for the network prior to communication between the host cloning utility and the plurality of target cloning utilities, and to communicate a location of the firmware package to the target cloning utility of each target networked device; and a terminal device having a graphical user interface for indicating an optimized network device executing the manually configured firmware package that has been optimized for the network and providing a unique identifier for the optimized network device so that its firmware package can be cloned, the target cloning utility of each target networked device copying to a storage unit therein without using a web browser the firmware package from the location communicated by the host cloning utility such that each target networked device among the plurality of target networked device stores firmware consisting only of manually configured firmware settings.

\* \* \* \* \*